Figure 1:
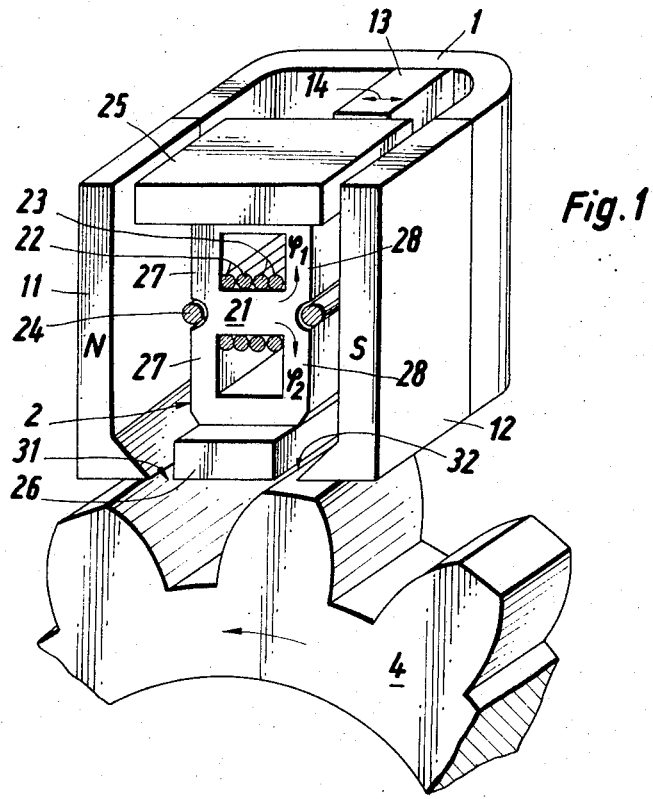

Jan. 30, 1968  R. KÜHNE  3,366,874
DEVICE RESPONSIVE TO MAGNETIC BODIES AND MAGNETIC FIELDS
Filed Nov. 18, 1963  3 Sheets-Sheet 1

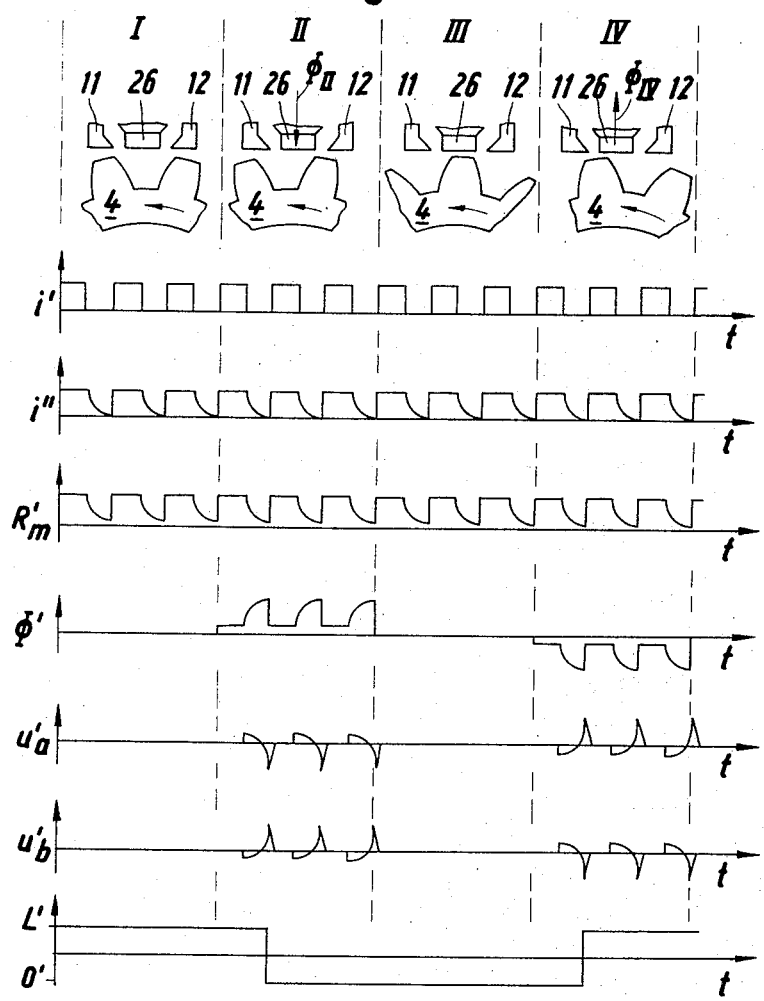

United States Patent Office 3,366,874
Patented Jan. 30, 1968

3,366,874
DEVICE RESPONSIVE TO MAGNETIC BODIES AND MAGNETIC FIELDS
Rudolf Kühne, Bern, Switzerland, assignor to Hasler AG, Bern, Switzerland
Filed Nov. 18, 1963, Ser. No. 324,584
Claims priority, application Switzerland, Nov. 16, 1962, 13,426/62
10 Claims. (Cl. 324—41)

The invention relates to a device which is responsive to magnetic or magnetizable bodies and magnetic fields and more particularly to the counting of magnetic bodies which are guided past this device, especially the counting of teeth of a rotating gear wheel consisting of magnetizable material. Such a device would have the teeth traveling past it within a certain time unit, and thus the device would serve as a means for measuring the number of teeth or correspondingly the number of revolutions.

It is an object of the invention to provide a device of this type which is also reponsive to stationary magnetic bodies and to stationary magnetic fields, and also to movements which take place at selectively slow speeds.

The device of the invention is characterized by at least one magnet, at least one magnetic circuit which includes at least one pair of legs consisting of magnetically saturable material and which extend in the field of the magnet between points which have equal magnetic potential, at least one exciter coil supplied with a pulsating current to produce a flux which saturates the legs in opposition to each other, and at least one induction coil which is arranged on the legs and is coupled to the fluxes in the magnetic legs, and decoupled or uncoupled with respect to the exciter winding.

It is an advantage of this novel device that the signal emitted consists of pulses which are of such a magnitude that they may be employed without further amplification to control digital circuit connections.

It is a further advantage of this novel device that this output signal may be obtained with a relatively small exciter output and that the initial current is a pulse current, for example a square pulse, which may be easily generated with connecting transistors.

For the purpose of counting magnetic bodies which travel in succession along a path of movement, the path of the bodies is guided through a part which passes from one magnetic pole to one of the above mentioned points of the magnetic field, and thereafter through the part of the leakage field of the magnet which passes from this point to the other magnetic pole, and the induction coil as well as the exciter coil are coupled to a circuit which compares the sign of each voltage surge which is induced in the induction coil with the sign of the voltage generated at the exciter coil, and which furnishes after each second change of the relationship of these signs a pulse to a counter.

The magnetic bodies may consist for example of the teeth of a gear wheel wherein the device is a gage for counting the rotations, or in the case where a counting operation is carried out per time unit, is a gage for counting the number of revolutions. In an application to a vehicle the device would serve as a gage to count the mileage or the kilometers, or also as a gage for measuring the speed, or speedometer.

Figure 2:
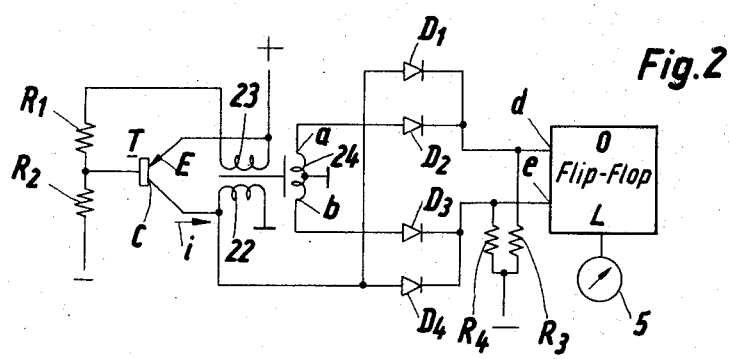
Figure 3:
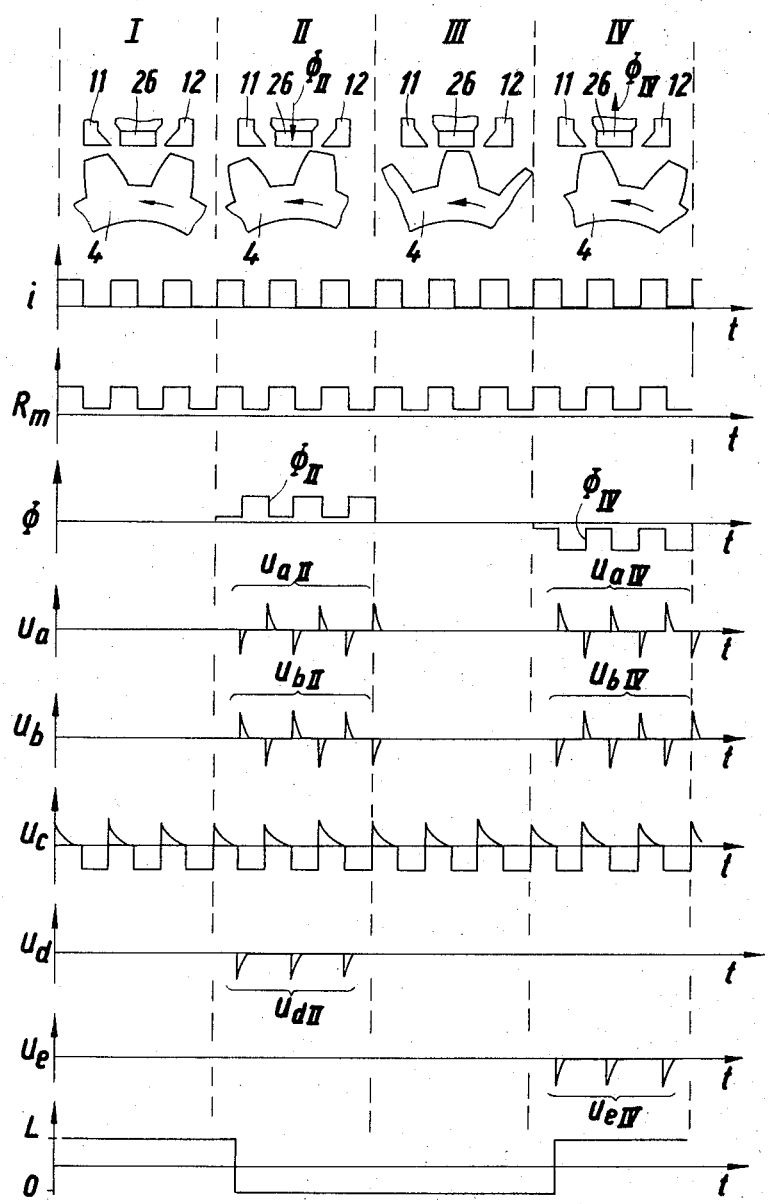

In the drawing an embodiment of the invention and its application is illustrated for the purpose of explaining the invention with its essential parts, and their operation. The invention is not intended to be limited in its scope to the specific details and elements of this example. In the drawing:

FIG. 1 shows an electromagnetic transmitter device of a tachometer;
FIG. 2 shows the circuit of the transmitter according to FIG. 1;
FIG. 3 shows a diagram explaining the operation of the tachometer of FIGS. 1 and 2;
FIG. 4 shows a modification of FIG. 2;
FIG. 5 shows a diagram of the operation of the tachometer of FIGS. 1 and 4.

The transmitter according to FIGURE 1 contains a device which is responsive to magnetic bodies and magnetic fields and includes a permanent magnet 1 having pole shoes 11 and 12. Two legs 27 and 28 of a ferromagnetic core 2 extend in the magnetic field between the pole shoes 11 and 12 between two points of equal magnetic potential. The core 2 is a sleeve core whose central cross-piece 21 has a larger cross section than the legs 27 and 28. The core carries on the cross-piece 21 an exciter coil 22 and an additional coil 23 whose purpose will be explained further hereafter in connection with FIGURE 2. An induction coil 24 is wound around both legs 27 and 28 and is so arranged that variations of the magnetic field which extends through both legs in the same direction induces voltages in this coil 24. As the flux generated in the core by the exciter coil 22 separates into two branches $\rho 1$ and $\rho 2$ whose effect on the induction coil 24 compensate each other, this induction coil 24 is uncoupled with respect to exciter coil 22 and the coil 23. The core 2 carries at its upper and lower end, as seen in the drawing, respectively a pole shoe 25 and 26. The distances of the pole shoe 25 from the pole shoes 11 and 12 are the same, and this is true also for the distances of the pole shoe 26 from the pole shoes 11 and 12. A magnetic side connection 13 is arranged between the central part of magnet 1 and the pole shoe 25, and is slidable in the direction of the double arrow 14. The ends of the pole shoes 11 and 12 facing the pole shoe 26 are so beveled that the width of the air gap decreases from the top to the bottom, as seen in the drawing, so that at these two air gaps 31 and 32 an intense leakage field passes outwardly from the magnetic system. Due to the equality of the air gaps on both sides of the pole shoe 25 and of the air gaps 31 and 32 on both sides of pole shoe 26, or due to the corresponding adjustment of the side connection 13, the permanent magnet 1 does not cause any magnetic flux in core 2 as long as the leakage field of the magnetic system is not disturbed. But as soon as one of these leakage fields is disturbed by the fact that a magnetic body is brought into the leakage field, or that a foreign magnetic field is superimposed on the leakage field, a magnetic flux is generated in core 2.

In order to make this magnetic flux noticeable independently of the speed, its changes or its disappearance, and to indicate thus also a stationary condition of this flux, a pulse current is fed to the exciter coil 22, this current being of such a value that it saturates magnetically the legs 27 and 28 of core 2 in a periodic manner. In the saturated state the magnetic resistance of core 2 is substantially greater than in the unsaturated state. For this reason the pulsating exciter current causes a periodic change of the magnetic resistance of core 2, and thus a periodic change of the flux which arises in core 2 when one or several of the leakage fields of the magnetic system are disturbed. Due to these flux changes voltages are generated periodically in coil 24, and in particular also when the magnetic disturbance of one or several of the leakage fields changes only slowly or remains entirely stationary.

According to FIGURE 1 the teeth of a gear 4 shown only in part are made of a magnetisable material and these teeth are moved one after the other past the air gaps 31 and 32 of the magnetic system. The gear 4 belongs to a gear wheel of the drive of a vehicle and rotates in proportion to the vehicle speed. In this manner the teeth of the gear 4 produce in a continuous alternation a disturbance of the leakage field at the air gaps 31 and 32. The distance of the teeth measured at the periphery of the gear is greater than the width of the pole shoe 26 measured from air gap 31 to air gap 32. For counting the passing of the teeth the circuit of FIGURE 2 is employed. In this circuit the exciter coil 22 and the coil 23 form the coupled coils of a blocking oscillator which includes additionally a transistor T with an emitter E and a collector C, and two resistances $R_1$ and $R_2$. This circuit has also two and-gates $D_1$, $D_2$, $R_3$ and $D_3$, $D_4$, $R_4$, a flip-flop device and a gage 5, which is a frequency gage. As the flip-flop device produces at each two successive changes of its state, a pulse at its outlet, the indication of gage 5 is proportional to the state changes of the flip-flop device taking place during the time unit. One input of each and-gate is connected to the collector C, the other input is connected to an end $a$ or $b$ of the induction coil 24, whose center tap is grounded. The output of each and-gate is located at one of the two inputs $d$, $e$ of the flip-flop device. Each of the two and-gates is designed to furnish an output voltage (negative) only when both input voltages are negative.

The diagram of FIGURE 3 shows the operation of the device described above wherein $i$ indicates the collector current of the transistor T (or the exciter current in coil 22), $R_m$ the magnetic resistance of legs 27 and 28 of core 2, $\Phi$ the magnetic flux in legs 27 and 28 of core 2 linked to the induction coil 24, $u_a$ and $u_b$ the voltage at the ends of the induction coil 24, $u_c$ the collector voltage of the transistor T, $u_d$ and $u_e$ the voltage at the two inputs $d$ and $e$ of the flip-flop device and O and L the two states of the flip-flop device, which all are represented dependent on the time $t$. In the upper part of the diagram of FIGURE 3 four different positions of the teeth of the gear 4 relative to the magnetic system are shown and designated by I–IV. The time sectors of the electrical processes represented thereunder are listed under these positions.

The exciter current (collector current) $i$ is independent of the position of the gear wheel 4 relative to the magnetic system. During each exciter current pulse the core 2 is magnetically saturated whereby its magnetic resistance $R_m$ is considerably increased. In the positions designated by numerals I and III the teeth of the gear wheel 4 are located substantially outside the leakage fields 31 and 32 of the magnetic system. These leakage fields are not disturbed here so that the magnet 1 produces no flux in core 2. Only the flux produced by the exciter current $i$, and the base current of the transistor T which is negligible in comparison to the exciter current $i$, is present in core 2, but this flux does not induce a voltage in the induction coil 24, as the latter is uncoupled from coils 22 and 23.

In position II a tooth of the gear 4 forms a magnetic side connection to the air gap 32 and reduces the magnetic resistance at this point. Because of this the pole shoes 25 and 26 have no longer the same magnetic potential, the pole shoe 26 having become magnetically south with regard to pole shoe 25 and the magnet 1 generates in the core 2 a flux which travels from pole shoe 25 to pole shoe 26. As the magnetic resistance $R_m$ of the core changes periodically, this flux $\Phi_{II}$ changes also periodically. The sudden changes to which this flux is subjected at the beginning and at the end of each exciter current pulse $i$, generates voltage surges $u_{aII}$ and $u_{bII}$ at the ends $a$ and $b$ of the induction coil 24. The and-gate $D_1$, $D_2$, $R_3$ furnishes a voltage $u_d$ at the input $d$ of the flip-flop only when $u_a$ and $u_c$ are simultaneously negative, and the and-gate $D_3$, $D_4$, $R_4$ furnishes a voltage $u_e$ at the input $e$ of the flip-flop only when $u_b$ and $u_c$ are simultaneously negative. For this reason a voltage surge $u_{dII}$ is produced at the input $d$ of the flip-flop only during the first, third and fifth voltage surge $u_{aII}$, and no voltage $u_e$ is generated. Under the effect of the first of the voltage surges $u_{dII}$ the flip-flop tilts from the state L into the state O, and the subsequent voltage surges remain without effect.

In the position IV the processes correspond to those described in connection with position II. A tooth of the gear 4 forms a magnetic side connection to the air gap 31. The pole shoe 26 is magnetically north, the magnet 1 generates in core 2 a flux which travels from pole shoe 26 to pole shoe 25. The course of this flux is shown in FIGURE 3 and designated by $\Phi_{IV}$. This flux generates voltage surges $u_{aIV}$ and $u_{bIV}$ at the ends $a$ and $b$ of the induction coil 24. From these voltage surges and the voltage $u_c$ the and-gate $D_3$, $D_4$, $R_4$ produces voltage surges $u_{eIV}$. The and-gate $D_1$, $D_2$, $R_3$ furnishes no voltage $u_d$ at the input $d$ of the flip-flop. The first of these voltage surges $u_{eIV}$ tilts the flip-flop from the state O into the state L, and the subsequent voltage surges are then without effect.

It may thus be seen that the flip-flop is tilted twice, and thus furnishes at its output a pulse when a tooth of the gear 4 passes successively at the air gaps 31 and 32. As the indication at the gage 5 is proportional to the state changes of the flip-flop taking place within the time unit, this indication is also proportional to the number of teeth of the gear 4 which pass within the time unit at the air gap 31 and 32. With a scale graduated accordingly the vehicle speed may thus be read directly at the gage 5.

In the case where the gage 5 is so constructed that it is able to count the pulses furnished by the flip-flop independently of the time, the device may be adjusted to serve as mileage or kilometer indicator. It is also possible to connect to the flip-flop two measuring devices, one of which indicates the speed and the other one the miles or kilometers driven. Both measuring devices may have parts of their circuit in common.

According to FIGURE 4 the magnetic core has only one exciter coil 22. This coil 22 is fed from a square pulse generator 6 and is shunted by a diode 7 whose forward direction is connected opposite to the direction of the voltage of the square pulses. The induction winding 24 whose center tap is grounded, is connected at its ends $a$ and $b$ to the two inputs of a flip-flop which is responsive only to negative pulses and whose output is connected to a frequency gage 5.

The operating procedures of this circuit are illustrated in FIGURE 5 in a manner corresponding to that of FIGURE 3. In this arrangement $i'$ designates the square current of generator 6, $i''$ the current in the exciter coil 22, $R'_m$, $\Phi'$, $u'_a$, $u'_b$, L' and O' have the same significance as $R_m$, $\Phi$, $u_a$, $u_b$, L or O in FIGURE 3.

The self inducted voltage which arises at the end of each square pulse at the exciter coil 22 generates a current through this coil and the diode 7. In this manner the current pulses $i''$ in coil 22 will have gradually decreasing back edge. The magnetic resistance $R'_m$ and the flux $\Phi'$ have a corresponding course. The voltages $u_a$ and $u'_b$ which are derived therefrom are un-symmetrical alternating voltages, the voltage of one polarity thereof being smaller and of greater duration than that of the other polarity. In this case it depends on the direction of the magnetic flux $\Phi'$ whether the greater voltage of shorter duration is positive at $u'_a$ and negative at $u'_b$ or whether it is the reverse. The smaller voltage of longer duration is not sufficient to tilt the flip-flop. The flip-flop tilts from the state L' into the state O' when $u'_b$ becomes negative and reversely from the state O' into the state L' when $u'_a$ becomes negative.

The diode 7 prevents also that the output of the square pulse generator is excessively loaded by the high self-inducted voltage of the exciter coil (at the end of each square pulse) in that it short-circuits this voltage. Instead of square pulses $i'$ one could also employ saw tooth pulses with gradually decreasing back edge. However, these pulses would cause in the output stage of the pulse generator a larger loss. The diode may be connected to the exciter coil 22 as illustrated or be connected to an additional winding coupled with coil 22 whereby a gradual course would be imparted to the pulse back edge and to the pulse front edge of the square wave.

The arrangement described with reference to FIGURES 1 to 5 is suitable, in a correspondingly altered arrangement, to count magnetic objects, which, instead of the teeth of the gear 4, are moved successively past air gaps 31 and 32, or to indicate the number of the passes which take place within the time unit. It is important that the speed at which the teeth of the gear 4 or other magnetic bodies are moved past the air gaps 31 and 32 have no influence on the operation, as long as the pulse frequency of the exciter current $i$ is so that, with each pass at least one pulse is produced. An extremely slow pass generates voltages of the same amplitude at the induction coil 24 as a rapid pass. The device responds also to stationary magnetic conditions because the voltage surges $u_a$, $u_b$ and $u_d$ or $u_e$ take place in continuous succession as long as the leakage field at air gap 31 or 32 is disturbed. The voltage surges are the more intensive the more the leakage field is disturbed so that also the degree of approach of a magnetic body to the particular air gap or the size of such a body may be recognized by the intensity of the voltage surges.

An essential advantageous feature of the arrangement of FIGURE 1 consists in that the magnetic flux $\varphi_1$, $\varphi_2$ induced by the exciter current flows only in the magnetic circuit formed by core 21 while in magnetic system 1, 11, 12, 25, 26 only the flux changes arise, the frequency of which is substantially lower than the pulse frequency of the exciter current. For this reason it is in general only necessary to construct core 21 of laminations while the other parts 11, 12, 25, 26 of the magnetic system may be constructed of compact material.

The example of FIGURES 1 and 2 in which a second coil is coupled to the exciter coil, and where these two coils together with the core form a part of a blocking oscillator, has the advantage that the core and these windings serve also to generate pulses. But a separate pulse generator may also be employed wherein the coil coupled with the exciter coil is eliminated, and a voltage for the and-gates which fulfills the purpose of voltage $u_c$ must be produced in another suitable manner, for example by a differentiation of the exciter current; in case a circuit is employed which corresponds to the part of the circuit illustrated at the right side in FIGURE 2, in order to process the voltage surges $u_a$ and $u_b$.

It is appropriate to arrange the core 2 and the pole shoes 25, 26 or at least one of these pole shoes, so as to be movable, so that the position in which these pole shoes are located, may be adjusted, in the case of an absence of disturbance or of a constant disturbance of the leakage field, at points of equal magnetic potential of the magnetic field of magnet 1. This position may be recognized for example in that in the case of undisturbed leakage fields and of an excitation of the core by the current $i$ no voltage $u_a$, $u_b$ arises. This condition may also be obtained by corresponding adjustment of the magnetic side connection 13.

The two air gaps 31, 32 may be filled in with non-magnetic material in order to prevent a penetration of magnetic particles.

In contrast to the core 2 shown in the embodiment illustrated here, the core may also be a closed U-shaped core wherein each of the two legs extending from pole shoe 25 to pole shoe 26 carries an exciter coil, and these exciter coils having a winding direction opposite to each other. In this case an induction coil may either surround these two legs or each of these legs may carry one of two induction coils having the same winding direction. The two exciter coils as well as the two induction coils must have the same number of turns and may be connected in parallel or in series.

The lower surfaces of pole shoes 11, 26, 12 as seen in FIGURE 1, which according to FIGURE 1 are located in one plane, may also pertain to a cylindrical surface which extends coaxially to the periphery of the gear 4.

It is not necessary that the disturbances of the leakage fields at the air gaps 31 and 32 which occur in timed succession be carried out by the same tooth of the gear wheel rim. But it is necessary that a tooth is not simultaneously located in front of air gap 31 where another tooth is in front of air gap 32. In view of this condition the distance of the air gaps 31, 32 and the distance of the teeth of the gear wheel 4 must be selected to fulfill this requirement.

In FIGURE 1 a second magnet may be arranged symmetrically to the magnet 1 at the front surfaces of pole shoes 11, 12.

When there is a danger that iron dust may be attracted by the magnetic poles, which dust could disturb the magnetic field, the entire device is enclosed by a non-magnetic cover which has a relatively large wall thickness or a relatively large distance from the magnetic circuit at the sides which do not face the gear wheel, while it is thinner at the side facing the gear wheel and has the form of a part of a hollow cylinder, which is brought as close as possible to the gear wheel, so that between the gear wheel and the cover no accumulation of iron dust may occur.

What is claimed is:

1. A device for producing electric pulses in response to magnetizable bodies, comprising in combination: a magnet having a first pair of pole shoes; a second pair of pole shoes disposed between the first pair of pole shoes; at least one pair of legs of magnetically saturatable material extending in the field of the magnet between the second pair of pole shoes, said second pair of pole shoes being separated from the first pair of pole shoes to provide four spaces between the first pair of pole shoes and the second pair of pole shoes, which spaces allow a substantial portion of the magnetic field of the magnet to pass outwardly from at least one of said spaces and permit flux from the magnet to pass in the same direction through the legs in the presence of a magnetizable body near said space; an exciter circuit supplied with a pulsating current and arranged on the legs for generating a flux to periodically saturate the legs in opposition to each other, so that flux from the magnet passing through the legs in the presence of a magnetizable body near said space is chopped by the periodic saturation of the legs; and an induction circuit arranged on the legs, said chopped magnetic flux periodically inducing a voltage pulse in the induction circuit to indicate the presence of a magnetizable body near said space.

2. The device according to claim 1, including a magnetizable crosspiece connecting the pair of legs and having a larger cross-section than the legs, wherein the exciter circuit includes a coil arranged on the crosspiece.

3. The device of claim 1, wherein the induction circuit includes a coil that surrounds the legs.

4. The device according to claim 1, including a square wave generator for supplying the pulsating current to the exciter circuit.

5. The device according to claim 4, including a diode connected in parallel with the square wave generator, wherein the transmission direction of the diode is opposite to the voltage of the pulses of the square wave generator, a pulse counter, and a flip-flop device having its inputs connected to the induction circuit and its output connected to the pulse counter.

6. The device according to claim 1, including an electrical circuit connected to the induction circuit and the exciter circuit, which electrical circuit compares the sign of each voltage pulse induced by said chopped magnetic flux in the induction circuit with the sign of each voltage pulse induced simultaneously by the pulsating current in the exciter circuit, and furnishes an output pulse when both of the compared pulses are of one and the same sign.

7. The device according to claim 1, wherein the exciter circuit includes a blocking oscillator for generating the pulsating current.

8. The device according to claim 1, for counting magnetizable bodies moved successively along a path of movement, wherein said path of movement of the bodies passes near one and thereafter near another one of said spaces, said device including a pulse counter, a flip-flop device, and an electrical circuit, said electrical circuit being connected to the induction circuit, the exciter circuit and the inputs of the flip-flop device, which electrical circuit compares the sign of each voltage pulse induced by said chopped magnetic flux in the induction circuit with the sign of each voltage pulse induced simultaneously by the pulsating current in the exciter circuit, and furnishes output pulses to the flip-flop device when the compared pulses are of one and the same sign, and the flip-flop device furnishes, after each second change in the relationship of these output pulses, a pulse to the pulse counter.

9. The device according to claim 8, wherein the magnetizable bodies are formed by at least one part of the teeth of a gear wheel of magnetizable material, the pulse counter counting the pulses conducted to it per unit of time, and including an indicator device calibrated in units of speed.

10. The device according to claim 8, wherein the electrical circuit has two and-gates, each having two inputs and an output, and the induction circuit has a central tap connected to a fixed potential, each end of said induction circuit being connected with one of the inputs of each and-gate, the other input of each and-gate being connected to the exciter circuit, and the output of each and-gate being connected to an input of the flip-flop device and the output of the flip-flop device being connected to the pulse counter.

References Cited
UNITED STATES PATENTS

| | | | |
|---|---|---|---|
| 2,649,568 | 8/1953 | Felch | 340—197 |
| 2,669,669 | 2/1954 | Spaulding | 324—70 |
| 2,918,666 | 12/1959 | Brower | 340—195 |
| 2,941,120 | 6/1960 | Harman | 324—70 |
| 3,948,842 | 8/1960 | Ditto | 340—197 |
| 2,995,631 | 8/1961 | Rubens | 324—43 |
| 3,018,381 | 1/1962 | Carroll | 324—70 |
| 3,161,387 | 12/1964 | Jutier | 324—41 |
| 3,197,658 | 7/1965 | Byrnes | 324—41 |
| 3,230,407 | 1/1966 | Marsh | 340—195 |

RUDOLPH V. ROLINEC, *Primary Examiner.*

WALTER L. CARLSON, *Examiner.*

M. J. LYNCH, *Assistant Examiner.*